Dec. 31, 1935.  J. GROBLING  2,025,739
AEROPLANE ATTACHMENT
Filed July 23, 1934
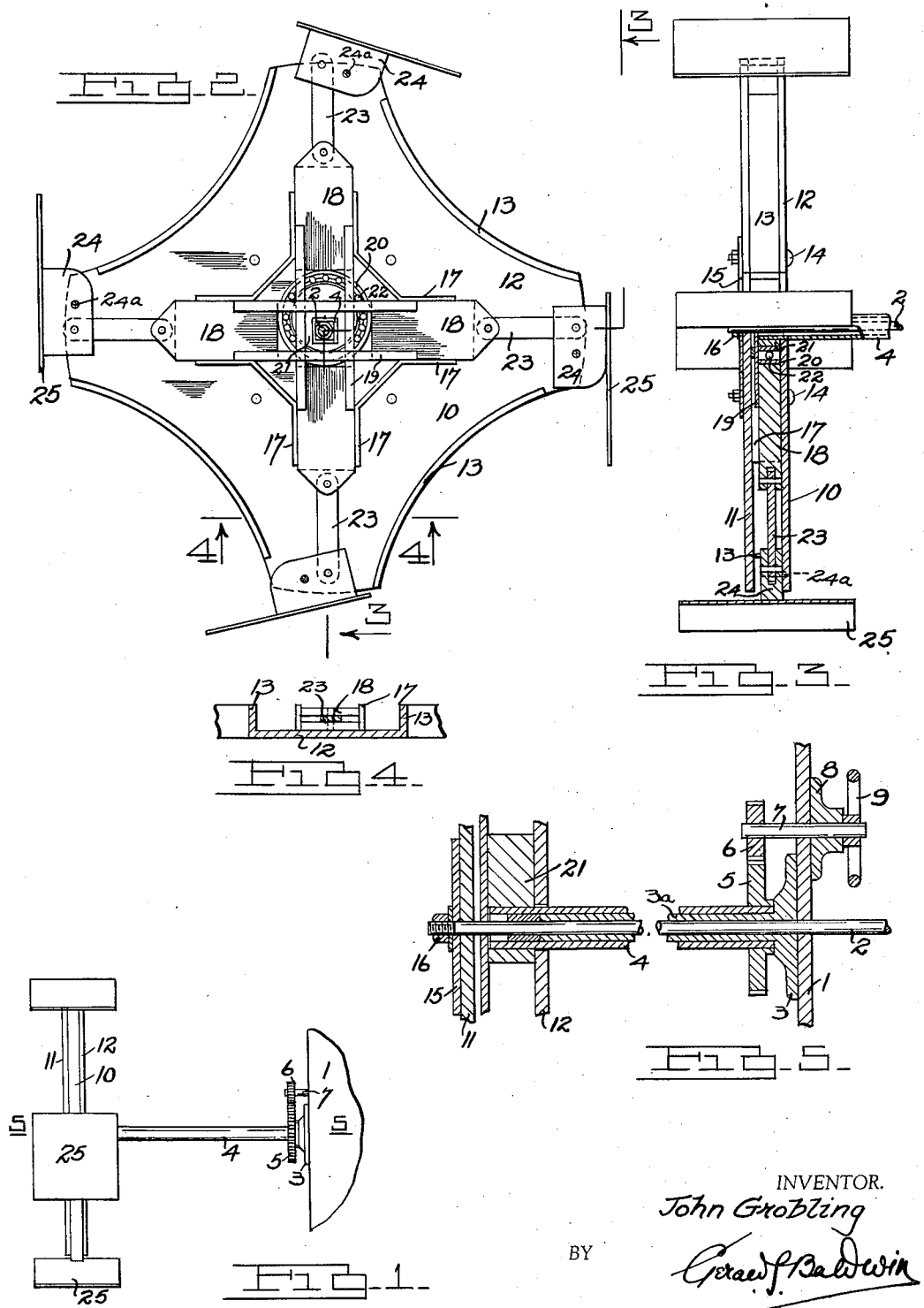
INVENTOR.
John Grobling
BY
Gerald F Baldwin
ATTORNEY.

Patented Dec. 31, 1935

2,025,739

UNITED STATES PATENT OFFICE 2,025,739

AEROPLANE ATTACHMENT

John Grobling, Detroit, Mich.

Application July 23, 1934, Serial No. 736,518

6 Claims. (Cl. 244—16)

This invention relates to improvements in aeroplane attachments, which are arranged to extend laterally from both sides of the fuselage, usually in alignment with one another. The invention aims, among other things, to provide such attachments to increase the lifting capacity of the plane so that it will rise sooner from the ground, and so that the plane may safely descend at a greater angle when travelling at a low speed; and to provide means for maintaining the plane in the air in the event of engine failure so that a safe landing may be made.

Another object of the invention is to provide such an attachment wherein substantially the whole of it rotates to perform its function, thereby reducing the wind resistance of the device to a minimum.

Yet another object of the invention is to provide such an attachment which is relatively cheap and simple to manufacture and easy to operate, so that it may either be employed for assisting to lift or lower the plane.

With these and other objects and advantages in view which will become apparent as the specification proceeds, the invention is hereinafter more fully described with the aid of the accompanying drawing, in which:

Figure 1 illustrates a portion of a fuselage of an aeroplane laterally from which one of the attachments projects.

Figure 2 is an enlarged end view of one of the attachments with the outer plate removed.

Figure 3 is a view partly in section taken on the line 3—3 of Figure 2.

Figure 4 is a section on the line 4—4 of Figure 2.

Figure 5 is an enlarged sectional view on the line 5—5 of Figure 1.

In the drawing only one attachment and a portion of a fuselage are shown, though it is of course understood that one or more such attachments are intended to project horizontally from each side of the aeroplane; moreover these attachments, which are similar in all respects, are preferably arranged in alignment with one another. In the following description I describe one attachment which projects from one side of the fuselage.

1 designates a portion of a fuselage horizontally and laterally through which a spindle 2 extends which is rotated by any desired means (not shown) within the body of the plane. Mounted externally on the fuselage 1 is a bearing member 3 outwardly from which a long bearing 3a extends. The latter encircles the spindle which is therein suitably supported for rotation. Around the bearing 3a a tubular shaft 4 is arranged for independent rotation. Fixed around the inner extremity of the shaft 4 is a gear 5 which meshes with a pinion 6 fixed upon a stub shaft 7. The latter extends through the fuselage 1, is rotatably supported as by a bearing 8, and is provided, within the body of the plane, with means for turning it, such as the handwheel 9.

The operating element 10 consists of an outer and an inner plate 11 and 12 of identical contour. Provided around the greater portion of the periphery of the inner plate 12 are laterally disposed flanges 13 against which the outer plate 11 is held as by screws 14. The outer extremity of the spindle 2 extends through both the plates 11 and 12 and is preferably a tight fit in the outer plate 11, or may be keyed thereto. The outer extremity of the spindle 2 passes, in the present instance, through a strengthening disc 15 resting upon the outer face of the plate 11, and is threaded at its end to receive a nut 16. Thus it will be seen that rotation of the spindle 2 causes the entire element 10 to revolve.

Formed integral with the inner plate 12 are opposed pairs of guideways 17 between each pair of which a slide 18 is longitudinally movable while one face thereof remains contiguous to the said plate 12. In the present construction two opposed pairs of slides 18 are shown though it is understood that the number of opposed pairs is subject to variation. Each opposed pair of slides 18 is held in spaced relation as by tie members 19. Mounted so as to have its periphery constantly in contact with the inner edge faces of all the slides 18 is a ring 20 within which a rotary disc 21 is housed; in the present case balls 22 are arranged between the periphery of the disc 21 and the bore of the ring 20. The outer extremity of the tubular shaft 4 is eccentrically mounted in the said disc so that rotation of the shaft turns it thereby causing eccentric movement of the ring 20, which, in turn, moves the slides 18 in their guideways 17.

Between the plates 11 and 12 and pivotally mounted upon the latter are a plurality of rockers 24; and 23 denotes links each of which is pivoted at one extremity to one of the slides 18 and at its other extremity to one of the rockers 24. A blade 25 extends laterally in all directions from one edge face of each rocker 24 and beyond the outer and inner plates 11 and 12.

From the foregoing it is obvious that as the element 10 turns through rotation of the spindle 2 the movement of the inner edge faces of the slides 18 around the eccentrically mounted ring 20 causes the said slides to move radially towards and from the axis of the spindle 2 thereby moving the rockers 24 pivotally about their axes 24a so that the inclination of the blades 25 is constantly being changed; and that by turning the hollow shaft 4 through the gears 5 and 6 and handwheel 9 the inclination of the blades at any given position may also be varied.

Again due to the eccentric arrangement of the disc 21 and ring 20 above described the inclination of two opposed blades 25 may be set so that both tend either to raise or lower the elevation of the plane as they near their vertical positions, while the blades when horizontally disposed are in neutral position; that is they then extend substantially at right angles to their supporting slides 18.

From the foregoing it will be readily seen that whenever the assistance of the attachments is required the spindle 2 is rotated, while the hollow shaft 4 is only turned when it is desired to adjust or alter the direction of the influence of these attachments.

While in the foregoing the preferred embodiment of the invention has been described and shown, it is understood that the construction is susceptible to such alterations and modifications as fall within the scope of the appended claims.

What I claim is:

1. An aeroplane attachment comprising a spindle extending laterally from one side of an aeroplane, an element mounted upon the spindle for rotation therewith, a disc within the element having an eccentric opening therethrough for the passage of the spindle, means holding the disc against rotation as the element and spindle turn, blades pivoted about axes parallel with the element axis extending transversely of the element, opposed slides held in spaced relation and having their edge faces in constant contact with the disc, means in said element supporting said slides for straight line reciprocation as the element turns around the disc, and means cooperating with the slides imparting reciprocating rotary motion to the blades as the element rotates.

2. An aeroplane attachment comprising a spindle extending laterally from one side of an aeroplane, an element mounted upon the outer extremity of the spindle for rotation therewith, an eccentric disc mounted in the element and having its axis coinciding with the element axis, means for holding the disc against rotation with the element, opposed slides mounted for straight line reciprocation in said element, means holding said opposed slides in spaced relation and with their adjacent faces bearing against the disc periphery so that the slides are moved by said disc as the element turns, blades pivoted on said element, and means moving the blades pivotally as the slides are reciprocated.

3. An aeroplane attachment comprising a spindle extending laterally from one side of an aeroplane, an element fixed on the outer extremity of the spindle, a tubular shaft around said spindle, a disc within the element eccentrically mounted upon the tubular shaft, blades pivoted on the element about axes parallel with the spindle, opposed slides held in spaced relation and having their adjacent faces in constant contact with the disc periphery, means in the element supporting the slides for straight line reciprocation, links connecting the slides with the blades, and means operable from within the body of the plane for turning the shaft and disc and thus varying the inclination of the blades.

4. An aeroplane attachment comprising a spindle extending laterally from one side of an aeroplane, a tubular shaft around the spindle, an element fixed on the outer extremity of the spindle, a disc in the element eccentrically mounted on the outer extremity of the shaft, opposed slides mounted for straight line reciprocation towards and from the element axis within the element, the adjacent faces of said slides being in constant contact with and reciprocated by said disc as the element turns, blades pivoted about axes parallel with the element axis, means connected to said slides moving the blades pivotally as the element turns, and independent means operable from within the body of the plane for turning the tubular shaft and varying the inclination of the blades at any given rotary position of the element 5. An aeroplane attachment comprising an element consisting of a flat plate having spaced laterally disposed flanges extending around the greater portion of its periphery, and a second plate resting upon the outer edge faces of the flanges, means holding said plates together, a spindle extending transversely through said plates to which the latter are fixed, an eccentric disc in said element, means normally holding said disc against rotation, a plurality of opposed slides in said element mounted for straight line reciprocation towards and from the spindle axis as the element is rotated, means retaining the adjacent faces of the opposed slides constantly against the disc periphery, blades pivoted between the plates and positioned between adjacent extremities of the flanges, and links moving the blades pivotally as the slides are reciprocated.

6. An aeroplane attachment comprising a spindle, an element thereon for rotation therewith, an eccentric disc in said element, means normally holding the disc against rotation, a ring around the disc, balls between the disc and ring, a plurality of opposed slides the inner edge faces of which bear against the periphery of the ring, means retaining the slides in contact with the ring so that straight line reciprocation is imparted to the slides as the element turns about the disc, a plurality of blades pivotally mounted upon the element adjacent its periphery, and means moving the blades pivotally as the slides are reciprocated.

JOHN GROBLING.